United States Patent
Ackerman

(10) Patent No.: US 11,546,355 B2
(45) Date of Patent: Jan. 3, 2023

(54) SUPPLEMENTAL ATTACK SURFACE SCANNER

(71) Applicant: Bank of America Corporation, Charlotte, NC (US)

(72) Inventor: Eric C. Ackerman, Danville, PA (US)

(73) Assignee: Bank of America Corporation, Charlotte, NC (US)

( * ) Notice: Subject to any disclaimer, the term of this patent is extended or adjusted under 35 U.S.C. 154(b) by 183 days.

(21) Appl. No.: 16/941,335

(22) Filed: Jul. 28, 2020

(65) Prior Publication Data

US 2022/0038470 A1 Feb. 3, 2022

(51) Int. Cl.
*H04L 9/40* (2022.01)

(52) U.S. Cl.
CPC ...... *H04L 63/1416* (2013.01); *H04L 63/1425* (2013.01)

(58) Field of Classification Search
CPC ............ H04L 63/1416; H04L 63/1425; H04L 63/1433
USPC ......................................................... 726/23
See application file for complete search history.

(56) References Cited

U.S. PATENT DOCUMENTS

| | | | |
|---|---|---|---|
| 7,249,187 B2 | 7/2007 | Sobel et al. | |
| 7,805,752 B2 | 9/2010 | Newstadt et al. | |
| 8,117,595 B2 | 2/2012 | Speare et al. | |
| 8,135,395 B2 * | 3/2012 | Cassett | H04L 41/5009 455/425 |
| 8,341,736 B2 | 12/2012 | Reasor et al. | |
| 8,695,079 B1 | 4/2014 | Miller et al. | |
| 9,213,836 B2 * | 12/2015 | Mayer | G06F 21/56 |
| 9,621,590 B1 * | 4/2017 | Jaiswal | H04L 63/20 |
| 9,843,564 B2 | 12/2017 | Zucker et al. | |
| 10,461,937 B1 * | 10/2019 | Allen | H04L 9/3234 |
| 10,511,584 B1 | 12/2019 | Baer et al. | |
| 2007/0261112 A1 * | 11/2007 | Todd | H04L 63/1483 726/2 |
| 2018/0293379 A1 * | 10/2018 | Dahan | G06F 21/568 |
| 2019/0251251 A1 * | 8/2019 | Carson | G06F 21/51 |
| 2019/0342338 A1 * | 11/2019 | Anandam | H04L 41/0866 |
| 2020/0042701 A1 * | 2/2020 | Yang | H04L 63/1416 |

(Continued)

OTHER PUBLICATIONS

"AlienVault Unified Security Management (USM) Overview," https://cybersecurity.att.com/resource-center/videos/alienvault-unified-security-management-usm-overview, AT&T Sybersecurity, Retrieved on Jul. 9, 2020.

(Continued)

*Primary Examiner* — Badri Narayanan Champakesan
(74) *Attorney, Agent, or Firm* — Weiss & Arons LLP

(57) ABSTRACT

Apparatus and the methods for security scanning. The apparatus may include a data collection machine. The data collection machine may be configured to transmit an executable file, from an enterprise monitoring process, to a computing machine. The computing machine may be set to be accessed only by a group of users. The computing machine may be a machine that does not have a pipeline to the Internet. The data collection machine may be configured to cause the computing machine to execute the executable file. The data collection machine may be configured to derive, from an output of the executable file, a monitoring condition in the computing machine. The enterprise monitoring process may be a process that includes only individuals that may be not part of the group.

14 Claims, 17 Drawing Sheets

(56) References Cited

U.S. PATENT DOCUMENTS

| | | | | |
|---|---|---|---|---|
| 2020/0082094 | A1* | 3/2020 | Mcallister | G06F 8/77 |
| 2020/0145439 | A1* | 5/2020 | Griggs | H04L 63/101 |
| 2020/0159947 | A1* | 5/2020 | Shenefiel | G06F 21/577 |
| 2020/0252416 | A1* | 8/2020 | Niv | H04L 41/0816 |
| 2021/0075794 | A1* | 3/2021 | Gazit | H04L 63/1408 |

OTHER PUBLICATIONS

"IT Security & Compliance—Problem Solved!" https://www.newnettechnologies.com/change-tracker-gen-7.html, New Net Technologies LLC, Retrieved on Jul. 9, 2020.

"Security That Meets Compliance Requirements, Mitigates Risk and Saves Money," https://atomicorp.com/about/, Atomicorp, Retrieved on Jul. 9, 2020.

"Cloud Computing and Data Center Infrastructure as a Service," https://www.expedient.com, Expedient, Retrieved on Jul. 9, 2020.

"CloudGuard Dome 9: Cloud Security and Compliance Posture Management," https://www.checkpoint.com/downloads/products/cloudguard-CSPM-cloud-security-platform-product-brief.pdf, Check Point Software Technologies Ltd., May 9, 2020.

"Symantec Control Compliance Suite 12.5," https://docs.broadcom.com/doc/control-compliance-suite-en, Symantec Corporation, Retrieved on Jul. 9, 2020.

"Cybersecurity for Enterprise and Industrial Organization," https://tripwire.com, Tripwire, Inc., Retrieved on Jul. 9, 2020.

"Tanium Comply: Perform Industry-Relevant Compliance Checks and Vulnerability Scans on Demand," https://www.tanium.com/products/tanium-comply/, Tanium, Retrieved on July. 9, 2020.

"HPE ArcSight Data Platform (ADP) Achieves Record Customer Growth," https://www.hpe.com/us/en/newsroom/news-advisory/2017/07/hpe-arcsight-data-platform-adp-achieves-record-customer-growth.html, Hewlett Packard Enterprise Development LP, Jul. 31, 2017.

"Intel Setup and Configuration Software (Intel SCS)," https://www.intel.com/content/www/us/en/software/setup-configuration-software.html, Intel Corporation, Retrieved on Jul. 9, 2020.

"Shield Your IT Environment from Ransomware and Malicious Insiders," https://www.netwrix.com/auditor9.html, Netwrix Corporation, Retrieved on Jul. 9, 2020.

"IT Management Software & Remote Monitoring Tools," https://www.solarwinds.com, SolarWinds Worldwide, LLC, Retrieved on Jul. 9, 2020.

"SOC-AS-A-SERVICE," https://www.blackstratus.com, CyberShark, Retrieved on July 9, 2020.

"ManageEngine—IT Operations and Service Management Software," https://www.manageengine.com. ZOHO Corp., Retrieved on Jul. 9, 2020.

"Microsoft System Center Configuration Manager," https://en.wikipedia.org/wiki/Microsoft_System_Center_Configuration_Manager, Wikimedia Foundation, Inc., Apr. 20, 2020.

Tom Iwanski, "Nessus: An Open-Source Option," https://www.itprotoday.com/print/35180, Feb. 19, 2002.

"Big Data Doesn't Have to Mean Big Problems," https://logrhythm.com, LogRhythm, Inc., Retrieved on Jul. 9, 2020.

"Tenable—The Cyber Exposure Company," https://www.tenable.com, Tenable, Inc., Retrieved on Jul. 9, 2020.

Martin Walker, "Understanding the Windows Dissolvable Agent," https://qualys-secure.force.com/discussions/s/article/000006226, Qualys, Inc., May 7, 2019.

"The Open Source Security Platform," https://wazuh.com, Wazuh Inc., Retrieved on Jul. 9, 2020.

* cited by examiner

600 baselines - Notepad

File  Edit  Format  View  Help

POLICY:BASELINES,,,,,,,,,
DATE:2020-01-29,,,,,,,,,
VERSION:1011,,,,,,,,
MsgRecID,Applicability, MessageTitle, Severity,ReferenceObject,Reference,Comparison,Expected,NotFoundOK

Baseline 001.015: AD Security:  Auditing of Changes to Active Directory Objects and Activity in Active Directory,,,,,,,,
89001007,DomainController,Advanced Audit - Account Management: User Account Management,3,granularAudit,User Account Management,regExConta
89001008,DomainController,Advanced Audit - Computer Account Management,3,granularAudit,Computer Account Management, regExContainedIn,^SUCCESS
89001009,DomainController,Advanced Audit - Security Group Management,3,granularAudit,Security Group Management, regExContainedIn,^SUCC
89001010,DomainController,Advanced Audit - Distribution Group Management,3,granularAudit,Distribution Group Management, regExContainedIn,^SUCC
89001011,DomainController,Advanced Audit - Application Group Management,3,granularAudit,Application Group Management, regExContainedIn,^SUCC 704 → #Baseline... (Comment that names the category)

702 → Checks related to the category

FIG. 7

```
1000
  1002    1004
#BASELINE 500.005: Windows Server: File System,,,,,,,,,
89010916, DomainController, Local file system types, 3, fileSystems,, regExNotContainedIn,, *-FAT.*,,0
89010916, MemberServer, Local file system types, 3, fileSystems,, regExNotContainedIn,, *-FAT.*,,0
  1006           1008
```

This version of the check will run against only sequestered network domain controllers This version of the check will run against only sequestered network member servers

FIG. 10

```
1100
#BASELINE 500.005: Windows Server: File System,,,,,,,,,
89010916, DomainController, Local file system types, 3, fileSystems,, regExNotContainedIn,, *-FAT.*,,0
89010916, MemberServer, Local filesystem types, 3, fileSystems,, regExNotContainedIn,, *-FAT.*,,0
```

Message Title — 1102

FIG. 11

```
1200
#BASELINE 500.005: Windows Server: File System,,,,,,,,,
89010916, DomainController, Local drive file system types, 3, fileSystems,, regExNotContainedIn,, *-FAT.*,,0
89010916, MemberServer, Local drive file system types, 3, fileSystems,, regExNotContainedIn,, *-FAT.*,,0
                                                        1202
```

This check is "P3" = High

BASELINE 500.005: Windows Server: File System,,,,,,,,

89010916, DomainController, Local drive file system types, 3, fileSystems,, regExNotContainedIn,, * - FAT.*,0

89010916, MemberServer, Local drive file system types, 3, fileSystems,, regExNotContainedIn,, * - FAT.*,0

1304 ⟶ 1302

This check refers to file systems on the scan target

BASELINE 500.005: Windows Server: File System,,,,,,,,

89010916, DomainController, Local drive file system types, 3, fileSystems,, regExNotContainedIn,, * - FAT.*,0

89010916, MemberServer, Local drive file system types, 3, fileSystems,, regExNotContainedIn,, * - FAT.*,0

1404 ⟶ 1402

This check has no applicable reference, so the column is blank

89008787,MemberServer,Domain member: Digitally encrypt secure channel data (when possible),2, .registryValue,HKEY_LOCAL_MACHINE\SYSTEM\CurrentControlSet\Services\Netlogon\Parameters\SealSecureChannel,regExContainedIn,^1$,0

1502

This check looks for the indicated registry value

BASELINE 500.005: Windows Server: File System,,,,,,,,

89010916, DomainController , Local drive file system types, 3, fileSystems,,,[regExNotContainedIn,.*,-FAT.*,0]

89010916, MemberServer , Local drive file system types, 3, fileSystems,,, regExNotContainedIn,.*,-FAT.*,0

1604

1602    1606

This check will 'fail' if any of the data returned by the scan has the pattern ".*,-FAT.*" in it

89005002,MemberServer,Interactive Logon: Smart Card Removal Behavior,2,registryValue, HKEY_LOCAL_MACHINE\SOFTWARE\Microsoft\Windows NT\CurrentVersion\Winlogon\ScRemoveOption, regExContainedIn, "^1$~,^2$~,^3$" 0

1702

This check will 'fail' if the registry value in question does not exist

89005030,MemberServer,MSS: (AutoAdminLogon) Enale Automatic Logon (not recommended)|,4,registryValue, HKEY_LOCAL_MACHINE\Software\Microsoft\Windows NT\CurrentVersion\Winlogon\AutoAdminLogon, regExContainedIn,^0$ 1

1802

This check will 'pass' if the registry value in question does not exist

FIG. 18

☐ SERVER1.csv - Notepad

File  Edit  Format  View  Help

Result, HostIP, FQ_Hostname, Short_Hostname, Severity, MsgRecID, Message, Description, Result_Details, Reference, OS_CPE, LastScanDate, OS_Info

FIG. 19

Result, HostIP, FQ_Hostname, Short_Hostname, Severity, MsgRecID, Message, Description, Result_Details, Reference, OS_CPE, LastScanDate, OS_Info FAILED, 192.168.3.22, SERVER1.mydomain.com, SERVER1, 1, 89001414, Windows Services installed,,
[FOUND] Running - Themes - Themes - Auto - LocalSystem [PROHIBITED] Running .* - Themes - .* [OR ALLOW NO DATA FOUND],
Themes, cpe:/o:microsoft:windows_server_2016:::datacenter:x64:, 06/12/2020 at 18:14:01 (GMT), WIN2016
Passed, 192.168.3.22, SERVER1.mydomain.com, SERVER1, 3, 89074132, Password setting - Enforce password history,,
[FOUND] 16 [REQUIRED] >= 8,
PasswordHistorySize, cpe:/o:microsoft:windows_server_2016:::datacenter:x64:, 06/12/2020 at 18:14:01 (GMT), WIN2016

2004 — FAILED
2002 — Themes
2006 — Passed
2008 — This check 'passed:' System found the desired configuration for the check
This check 'failed:' System found a configuration that did not match what the system was expecting for this item

Result, HostIP, FQ_Hostname, Short_Hostname, Severity, MsgRecID, Message, Description, Result_Details, Reference, OS_CPE, LastScanDate, OS_Info
FAILED, [192.168.3.22], SERVER1.mydomain.com, SERVER1, 1, 89001414, Windows Services installed,,
[FOUND] Running - Themes - Themes - Auto - LocalSystem [PROHIBITED] Running .* - Themes - . * [OR ALLOW NO DATA FOUND],
Themes, cpe:/o:microsoft:windows_server_2016::::datacenter:x64:, 06/12/2020 at 18:14:01 (GMT), WIN2016
Passed, 192.168.3.22, SERVER1.mydomain.com, SERVER1, 3, 89074132, Password setting - Enforce password history,,
[FOUND] 16 [REQUIRED] >=8,
PasswordHistorySize, cpe:/o:microsoft:windows_server_2016::::datacenter:x64:, 06/12/2020 at 18:14:01 (GMT), WIN2016
            ↑ IP Address 2102  2104

Result, HostIP, FQ_Hostname, Short_Hostname, Severity, MsgRecID, Message, Description, Result_Details, Reference, OS_CPE, LastScanDate, OS_Info
FAILED, 192.168.3.22, [SERVER1.mydomain.com], SERVER1, 1, 89001414, Windows Services installed,,
[FOUND] Running - Themes - Themes - Auto - LocalSystem [PROHIBITED] Running .* - Themes - . * [OR ALLOW NO DATA FOUND],
Themes, cpe:/o:microsoft:windows_server_2016::::datacenter:x64:, 06/12/2020 at 18:14:01 (GMT), WIN2016
Passed, 192.168.3.22, SERVER1.mydomain.com, SERVER1, 3, 89074132, Password setting - Enforce password history,,
[FOUND] 16 [REQUIRED] >=8,
PasswordHistorySize, cpe:/o:microsoft:windows_server_2016::::datacenter:x64:, 06/12/2020 at 18:14:01 (GMT), WIN2016
            ↑ FQDN 2202  2204

FIG. 22

Result, HostIP, FQ_Hostname, Short_Hostname, Severity, MsgRecID, Message, Description, Result_Details, Reference, OS_CPE, LastScanDate, OS_Info
FAILED, 192.168.3.22, SERVER1.mydomain.com, [SERVER1], 1, 89001414, Windows Services installed,,
[FOUND] Running - Themes - Themes - Auto - LocalSystem [PROHIBITED] Running .* - Themes - .* [OR ALLOW NO DATA FOUND],
Themes, cpe:/o:microsoft:windows_server_2016:::::datacenter:x64:, 06/12/2020 at 18:14:01 (GMT), WIN2016
Passed, 192.168.3.22, SERVER1.mydomain.com, SERVER1, 3, 89074132, Password setting - Enforce password history,,
[FOUND] 16 [REQUIRED] >=8,
PasswordHistorySize, cpe:/o:microsoft:windows_server_2016:::::datacenter:x64:, 06/12/2020 at 18:14:01 (GMT), WIN2016

Short hostname

FIG. 23

Result, HostIP, FQ_Hostname, Short_Hostname, Severity, MsgRecID, Message, Description, Result_Details, Reference, OS_CPE, LastScanDate, OS_Info
FAILED, 192.168.3.22, SERVER1.mydomain.com, SERVER1, [1], 89001414, Windows Services installed,,
[FOUND] Running - Themes - Themes - Auto - LocalSystem [PROHIBITED] Running .* - Themes - .* [OR ALLOW NO DATA FOUND],
Themes, cpe:/o:microsoft:windows_server_2016:::::datacenter:x64:, 06/12/2020 at 18:14:01 (GMT), WIN2016
Passed, 192.168.3.22, SERVER1.mydomain.com, SERVER1, 3, 89074132, Password setting - Enforce password history,,
[FOUND] 16 [REQUIRED] >=8,
PasswordHistorySize, cpe:/o:microsoft:windows_server_2016:::::datacenter:x64:, 06/12/2020 at 18:14:01 (GMT), WIN2016

Severity "1"

FIG. 24

Result, HostIP, FQ_Hostname, Short_Hostname, Severity, MsgRecID, Message, Description, Result_Details, Reference, OS_CPE, LastScanDate, OS_Info
FAILED, 192.168.3.22, SERVER1.mydomain.com, SERVER1, 1, 89001414, Windows Services installed,,
[FOUND] Running - Themes - Themes - Auto - LocalSystem [PROHIBITED] Running .* - Themes - . * - [OR ALLOW NO DATA FOUND],
Themes, cpe:/o:microsoft:windows_server_2016:::::datacenter:x64:, 06/12/2020 at 18:14:01 (GMT), WIN2016
Passed, 192.168.3.22, SERVER1.mydomain.com, SERVER1, 3, 89074132, Password setting - Enforce password history,,
[FOUND] 16 [REQUIRED] >=8,
PasswordHistorySize, cpe:/o:microsoft:windows_server_2016:::::datacenter:x64:, 06/12/2020 at 18:14:01 (GMT), WIN2016

2502  2504

Check ID 89001414

FIG. 25 — 2500

Result, HostIP, FQ_Hostname, Short_Hostname, Severity, MsgRecID, Message, Description, Result_Details, Reference, OS_CPE, LastScanDate, OS_Info
FAILED, 192.168.3.22, SERVER1.mydomain.com, SERVER1, 1, 89001414, Windows Services installed,,
[FOUND] Running - Themes - Themes - Auto - LocalSystem [PROHIBITED] Running .* - Themes - . * - [OR ALLOW NO DATA FOUND],
Themes, cpe:/o:microsoft:windows_server_2016:::::datacenter:x64:, 06/12/2020 at 18:14:01 (GMT), WIN2016
Passed, 192.168.3.22, SERVER1.mydomain.com, SERVER1, 3, 89074132, Password setting - Enforce password history,,
[FOUND] 16 [REQUIRED] >=8,
PasswordHistorySize, cpe:/o:microsoft:windows_server_2016:::::datacenter:x64:, 06/12/2020 at 18:14:01 (GMT), WIN2016

2602  2604

Check title "Windows Services installed"

2704
Result, HostIP, FQ_Hostname, Short_Hostname, Severity, MsgRecID, Message, Description, Result_Details, Reference, OS_CPE, LastScanDate, OS_Info
FAILED, 192.168.3.22, SERVER1.mydomain.com, SERVER1, 1, 89001414, Windows Services installed, 2706 [OR ALLOW NO DATA FOUND],
[FOUND] Running - Themes - Themes - Auto - LocalSystem [PROHIBITED] Running .* - Themes - .* [OR ALLOW NO DATA FOUND],
Themes, cpe:/o:microsoft:windows_server_2016:::::datacenter:x64:, 06/12/2020 at 18:14:01 (GMT), WIN2016
Passed, 192.168.3.22, SERVER1.mydomain.com, SERVER1, 3, 89074132, Password setting - Enforce password history,,
[FOUND] 16 [REQUIRED] >=8,
PasswordHistorySize, cpe:/o:microsoft:windows_server_2016:::::datacenter:x64:, 06/12/2020 at 18:14:01 (GMT), WIN2016

Description is Left Blank

2801
Result, HostIP, FQ_Hostname, Short_Hostname, Severity, MsgRecID, Message, Description, Result_Details, Reference, OS_CPE, LastScanDate, OS_Info
FAILED, 192.168.3.22, SERVER1.mydomain.com, SERVER1, 1, 89001414, Windows Services installed,, 2806
2804 Themes, cpe:/o:microsoft:windows_server_2016 [PROHIBITED] Running .* - Themes - .* [OR ALLOW NO DATA FOUND]
2802 Themes, cpe:/o:microsoft:windows_server_2016:::::datacenter:x64:, 06/12/2020 at 18:14:01 (GMT), WIN2016
Passed, 192.168.3.22, SERVER1.mydomain.com, SERVER1, 3, 89074132, Password setting - Enforce password history,,
2803 [FOUND] 16 [REQUIRED] >=8, 2810
PasswordHistorySize, cpe:/o:microsoft:windows_server_2016:::::datacenter:x64:, 06/12/2020 at 18:14:01 (GMT), WIN2016

What System found on the target
2808

What System was looking for

Result, HostIP, FQ_Hostname, Short_Hostname, Severity, MsgRecID, Message, Description, Result_Details, Reference, OS_CPE, LastScanDate, OS_Info
FAILED, 192.168.3.22, SERVER1.mydomain.com, SERVER1, 1, 89001414, Windows Services installed,,
[FOUND] Running - Themes - Themes - Auto - LocalSystem [PROHIBITED] Running .* - Themes - .* [OR ALLOW NO DATA FOUND],
Themes, cpe:/o:microsoft:windows_server_2016:::::datacenter:x64:, 06/12/2020 at 18:14:01 (GMT), WIN2016
Passed, 192.168.3.22, SERVER1.mydomain.com, SERVER1, 3, 89074132, Password setting - Enforce password history,,,
[FOUND] 16 [REQUIRED] >=8,
PasswordHistorySize, cpe:/o:microsoft:windows_server_2016:::::datacenter:x64:, 06/12/2020 at 18:14:01 (GMT), WIN2016

Reference value from the configuration file
(in this case, the "Themes" service)

Result, HostIP, FQ_Hostname, Short_Hostname, Severity, MsgRecID, Message, Description, Result_Details, Reference, OS_CPE, LastScanDate, OS_Info
FAILED, 192.168.3.22, SERVER1.mydomain.com, SERVER1, 1, 89001414, Windows Services installed,,
[FOUND] Running - Themes - Themes - Auto - LocalSystem [PROHIBITED] Running .* - Themes - .* [OR ALLOW NO DATA FOUND],
Themes, cpe:/o:microsoft:windows_server_2016:::::datacenter:x64:, 06/12/2020 at 18:14:01 (GMT), WIN2016
Passed, 192.168.3.22, SERVER1.mydomain.com, SERVER1, 3, 89074132, Password setting - Enforce password history,,,
[FOUND] 16 [REQUIRED] >=8,
PasswordHistorySize, cpe:/o:microsoft:windows_server_2016:::::datacenter:x64:, 06/12/2020 at 18:14:01 (GMT), WIN2016

3004 → Windows Server 2016 Datacenter Edition

FIG. 30

Result, HostIP, FQ_Hostname, Short_Hostname, Severity, MsgRecID, Message, Description, Result_Details, Reference, OS_CPE, LastScanDate, OS_Info
FAILED, 192.168.3.22, SERVER1.mydomain.com, SERVER1, 1, 89001414, Windows Services installed,,
[FOUND] Running - Themes - Themes - Auto - LocalSystem [PROHIBITED] Running .* - Themes - .* [OR ALLOW NO DATA FOUND],
Themes, cpe:/o:microsoft:windows_server_2016:::datacenter:x64:, 06/12/2020 at 18:14:01 (GMT), WIN2016
Passed, 192.168.3.22, SERVER1.mydomain.com, SERVER1, 3, 89074132, Password setting - Enforce password history,,
[FOUND] 16 [REQUIRED] >=8, 3104
PasswordHistorySize, cpe:/o:microsoft:windows_server_2016:::datacenter:x64:, 06/12/2020 at 18:14:01 (GMT), WIN2016

Target ran executable file on June 12 at 6:14 PM

FIG. 31

Result, HostIP, FQ_Hostname, Short_Hostname, Severity, MsgRecID, Message, Description, Result_Details, Reference, OS_CPE, LastScanDate, OS_Info
FAILED, 192.168.3.22, SERVER1.mydomain.com, SERVER1, 1, 89001414, Windows Services installed,,
[FOUND] Running - Themes - Themes - Auto - LocalSystem [PROHIBITED] Running .* - Themes - .* [OR ALLOW NO DATA FOUND],
Themes, cpe:/o:microsoft:windows_server_2016:::datacenter:x64:, 06/12/2020 at 18:14:01 (GMT), WIN2016
Passed, 192.168.3.22, SERVER1.mydomain.com, SERVER1, 3, 89074132, Password setting - Enforce password history,,
[FOUND] 16 [REQUIRED] >=8,
PasswordHistorySize, cpe:/o:microsoft:windows_server_2016:::datacenter:x64:, 06/12/2020 at 18:14:01 (GMT), WIN2016 — 3204

Abbreviated name for the OS running on the target system

FIG. 32

SUPPLEMENTAL ATTACK SURFACE SCANNER

BACKGROUND

Enterprises depend on data that is sensitive, and is therefore stored on machines that have restricted access, even to the exclusion of enterprise monitoring scanning teams. This makes monitoring vulnerabilities and baseline configuration scanning difficult.

Therefore, it would be desirable to provide apparatus and methods for security scanning.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 6 shows illustrative information in accordance with principles of the invention.

FIG. 7 shows illustrative information in accordance with principles of the invention.

FIG. 10 shows illustrative information in accordance with principles of the invention.

FIG. 11 shows illustrative information in accordance with principles of the invention.

FIG. 12 shows illustrative information in accordance with principles of the invention.

FIG. 13 shows illustrative information in accordance with principles of the invention.

FIG. 14 shows illustrative information in accordance with principles of the invention.

FIG. 15 shows illustrative information in accordance with principles of the invention.

FIG. 16 shows illustrative information in accordance with principles of the invention.

FIG. 17 shows illustrative information in accordance with principles of the invention.

FIG. 18 shows illustrative information in accordance with principles of the invention.

FIG. 19 shows illustrative information in accordance with principles of the invention.

FIG. 20 shows illustrative information in accordance with principles of the invention.

FIG. 21 shows illustrative information in accordance with principles of the invention.

FIG. 22 shows illustrative information in accordance with principles of the invention.

FIG. 23 shows illustrative information in accordance with principles of the invention.

FIG. 24 shows illustrative information in accordance with principles of the invention.

FIG. 25 shows illustrative information in accordance with principles of the invention.

FIG. 26 shows illustrative information in accordance with principles of the invention.

FIG. 27 shows illustrative information in accordance with principles of the invention.

FIG. 28 shows illustrative information in accordance with principles of the invention.

FIG. 29 shows illustrative information in accordance with principles of the invention.

FIG. 30 shows illustrative information in accordance with principles of the invention.

FIG. 31 shows illustrative information in accordance with principles of the invention.

FIG. 32 shows illustrative information in accordance with principles of the invention.

DETAILED DESCRIPTION

Figure 1:
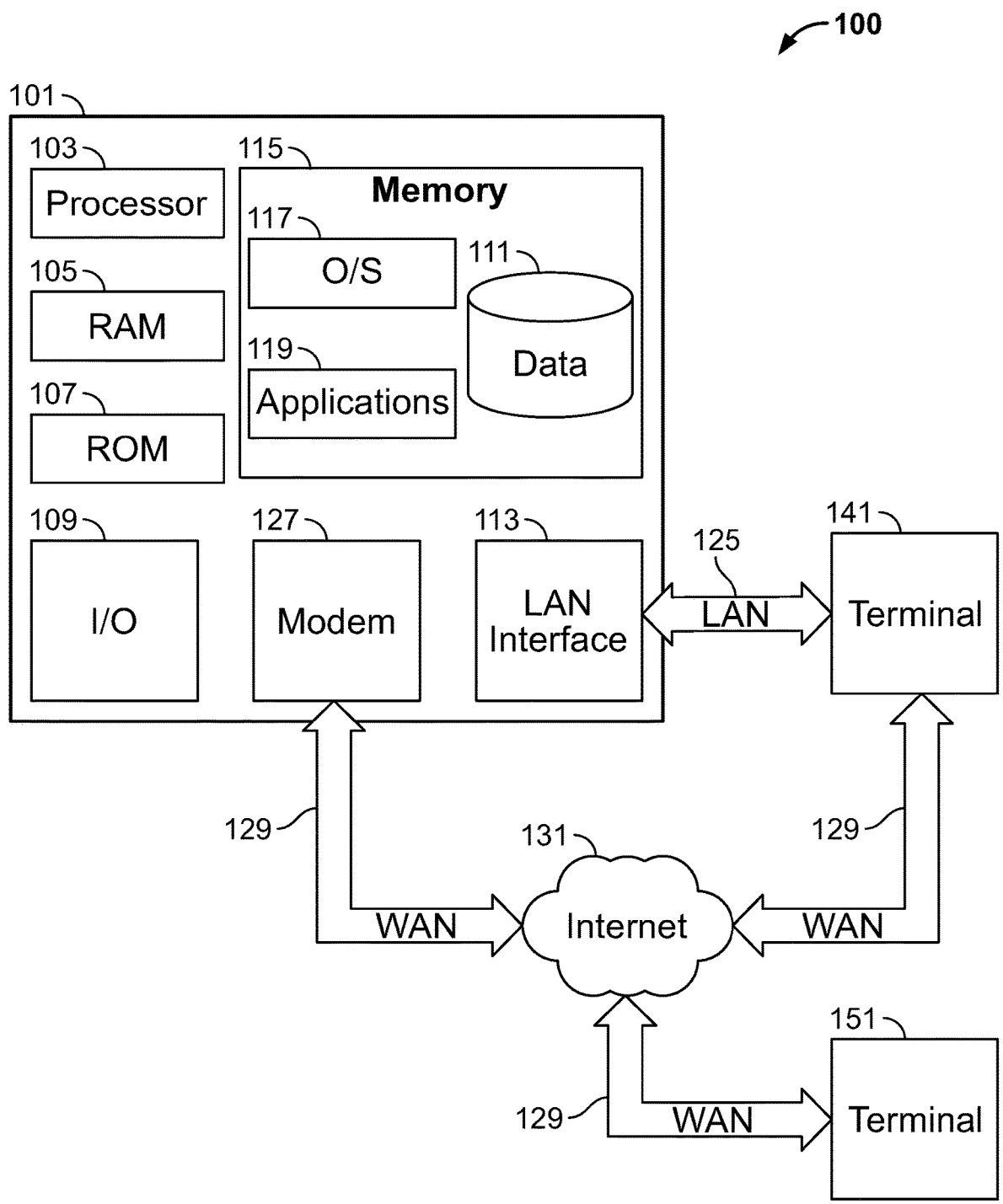
FIG. 1 shows illustrative apparatus that may be used in accordance with principles of the invention.

The apparatus may include, and the methods may involve, apparatus for security scanning.

The apparatus may include a data collection machine. The data collection machine may be configured to transmit an executable file, from an enterprise monitoring process, to a computing machine. The enterprise monitoring process may include a vulnerability monitoring process. The enterprise monitoring process may include a configuration scanning process. The computing machine may be set to be accessed only by a group of users. The computing machine may be a machine that does not have a pipeline to the Internet. The computing machine may be part of a sequestered, or "air-gapped," network environment. A sequestration of the sequestered network environment may be relative to an enterprise network. The enterprise network and the sequestered network may be under control of the same person or entity. Table 1 lists illustrative features of a sequestered network environment.

TABLE 1

Illustrative features of a sequestered network environment.
Illustrative feature No network traffic runs between the sequestered network and the enterprise network, except that allowed through the sequestered network perimeter firewall.
No direct or indirect network connections from the sequestered network to the Internet are allowed.
The sequestered network is managed by a small, dedicated team, and is not accessible to enterprise IT teams.
No management interface hosted outside the sequestered network can be used to access systems within the sequestered network.
Remote scanning of systems within the sequestered network, using administrative credentials over a network connection, is not allowed.
Configuration and vulnerability data from systems in the sequestered network must be stored within the sequestered network or the enterprise network (e.g., no storage of data in the public cloud).

TABLE 1-continued

Illustrative features of a sequestered network environment.
Illustrative feature No non-Microsoft ® resident software is allowed on systems within the sequestered network.
Sequestered network is managed by designated persons, with no control by persons designated to manage enterprise network.
Other suitable features The data collection machine may be configured to cause the computing machine to execute the executable file. The data collection machine may be configured to derive, from an output of the executable file, a monitoring condition in the computing machine. The output may include a report.

The enterprise monitoring process may be a monitoring process that includes only individuals that may be not part of the group.

For purposes herein, a "monitoring process" is defined as one or more elements of computer software, computer hardware, and human resources that are aligned to detect information systems vulnerabilities.

The data collection machine may be configured to send to the computing machine a configuration file that may include a security configuration record. The configuration file may include a list of vulnerabilities or configuration issues. The configuration file may be formatted as CSV. The executable file may ignore commented-out records in the configuration file, which may be identified with a "#."

Table 2 lists illustrative features of the executable file, the configuration file, and their cooperative functions.

TABLE 2

Illustrative features of the executable file, the configuration
file, and their cooperative functions.
Illustrative feature No network traffic runs between the sequestered network and the enterprise network, except that allowed through the sequestered network perimeter firewall.
No direct or indirect network connections from the sequestered network to the Internet are allowed.
The sequestered network is managed by a small, dedicated team, and is not accessible to enterprise IT teams.
No management interface hosted outside the sequestered network can be used to access systems within the sequestered network.
Remote scanning of systems within the sequestered network, using administrative credentials over a network connection, is not allowed.
Configuration and vulnerability data from or regarding systems in the sequestered network must be stored within the sequestered network or the enterprise network (e.g., no storage of data in the public cloud).
No non-Microsoft ® resident software is allowed on systems within the sequestered network.
The executable file may be transient (non-persistent) software. The executable may include a single executable, and may be configured for operation with a single configuration file. The executable file and the configuration file may be delivered, executed and removed via any means available within the sequestered environment. For example, they may be run using automated software distribution capabilities, run manually from a flash drive, etc.
The configuration file may include a text file in comma-separated (CSV) format. The output may be written locally on the target system to a CSV file. The CSV file may be imported into a database or reporting facility that may be available within the sequestered network or the enterprise network.
The executable file may be written in Microsoft ® Visual Basic ® .NET.
Other suitable features Table 3 lists illustrative columns, and corresponding descriptions, of the configuration file.

TABLE 3

Illustrative columns and corresponding descriptions, of a configuration file.

| Illustrative Column | Description |
| --- | --- |
| MsgRecID | The message number for the check |
| Applicability | The type of system the check applies to (e.g., "Domain Controller vs. Member Server") |
| MessageTitle | The title of the check that will appear in reporting |
| Severity | The risk rating for the check |
| ReferenceObject | The technical area of the check (e.g., registry, local security settings, etc.) |
| Reference | The specific location the check is looking for (e.g., key/value within the registry) |
| Comparison | Type of comparison being performed (e.g., regular expression) |
| Expected | Expected results of the comparison against data found |
| NotFoundOK | Whether or not the check should 'pass' if the desired information is not found on the system |
| Other suitable columns | |

The ReferenceObject column indicates the general technology category to which each check pertains. Table 4 lists illustrative values of the ReferenceObject column.

TABLE 4

Illustrative values of the ReferenceObject column.
Illustrative value

DomainRole
EventLogProperty
FileAttributes
FileExists
FileOrFolderOwner
FileOrFolderPermissions
FileSystems
FolderAttributes
FolderExists
GranularAudit
NetworkAdapterDescription
NetworkAdapterIP
OSArchitecture
OSName
OSServicePack
OSVersion
Processes
RegistryKeyExists
RegistryValue
RRASEnabled
SecurityOption
SecuritySettingBoolean
SecuritySettingNumeric
Services
Shares
SystemFQDN
SystemIPV4
SystemAuditingEvent
Other suitable values For each scanned value in the configuration of a scanned machine, there may be an expected value. Different comparisons between the scanned value and the expected value may be performed. Table 5 lists illustrative comparisons and corresponding pass-requirements.

TABLE 5

Illustrative comparisons and corresponding pass-requirements.

| Illustrative comparison (of configuration record to scanned computing machine record) | Pass-requirement |
| --- | --- |
| RegExContainedIn | At least one of the regular expressions in the 'Expected' column matches the scanned value |
| RegExNotContainedIn | None of the regular expressions in the 'Expected' column matches any part of the scanned value |
| RegExContainsAll | All of the regular expressions in the 'Expected' column match the scanned value |
| RegExContainsExact | The single supplied RegEx in the 'Expected' column exactly matches the scanned data (equivalent to RegExContainedIn with only one 'Expected' value, using the '^' and '$' anchors) |
| IntegerContainedIn | The scanned value falls within at least one of the integer ranges provided in the 'Expected' column |
| Other suitable columns | |

The data collection machine may be configured to block the configuration file from transmission to the Internet.

The executable file may be configured to retrieve from storage in the computing machine a security item. The executable file may be configured to compare the security configuration record to the security item.

The security item may include file metadata, such as values of the ReferenceObject.

The metadata may include a filename.

The metadata may include a version number.

The computing machine may be a machine of a plurality of computing machines. Each machine of the plurality may be set to be accessed only by the group of users. Each machine of the plurality may be a machine that does not have a pipeline to the Internet.

The plurality of computing machines may be contained within a security airgap. The security airgap may encompass a software distribution server. The software distribution server may be in electronic communication with each of the computing machines.

The data collection machine may be configured to transmit the executable file to the server.

The methods may include a method for security scanning. The methods may include transmitting the executable file, from an enterprise monitoring process, to the computing machine. The methods may include, using the computing machine, executing the executable file; and The methods may include, using the computing machine, deriving, from an output of the executable file, a monitoring condition in the computing machine.

The methods may include, when the group of users may be a first group of users, providing the output to a second group of users. The second group of users may be part of the enterprise monitoring process. The second group of users may be a group that is not part of the first group. The first group may be a "sequestered" group. The machines to which the first group, but not the second group, have access, may be included in a "sequestered" network. The machines to which the second group have access may include an "enterprise" network.

The methods may include transmitting, from the enterprise monitoring process, to the computing machine, the configuration file.

The methods may include blocking the configuration file from transmission to the Internet from the enterprise process.

The executing may include using the executable file to compare the security configuration record to a security item retrieved from storage in the computing machine.

The deriving may include providing a comparison of the security configuration record and the security item.

The transmitting may include sending the executable file to the server.

The enterprise monitoring process may be owned by a first party;

The server may include an application product sourced from a second party. It may be that no application that is resident on any of the plurality of computing machines is an application sourced from a party other than the second party.

The providing may include sending the output from the server.

Table 6 lists illustrative columns in an illustrative file including the output.

TABLE 6

Illustrative columns in an illustrative file including the output.

| Column | Description |
| --- | --- |
| Result | Whether the scanned system passed or failed the check |
| HostIP | The IPv4 address of the scanned system |
| FQ_Hostname | The fully-qualified hostname of the scanned system |
| Short_Hostname | The short name (NetBIOS) of the scanned system |
| Severity | The severity rating of the check |
| MsgRecID | The check ID number |
| Message | The check title |
| Description | (Reserved for future use) |
| Result_Details | The information found on the target system related to the check, along with what was expected for this check, based on the configuration file |
| Reference | The object of the check (if applicable) |
| OS_CPE | CPE-formatted description of the OS running on the scanned system |
| LastScanDate | The date and time that the check was performed |
| OS_Info | An abbreviated string representing the OS running on the scanned system |
| Other suitable columns | |

Table 7 lists illustrative output, including returned data formats corresponding to a configuration file ReferenceObject column.

TABLE 7

Illustrative output, including returned data formats corresponding to ReferenceObject column values.

| Illustrative ReferenceObject | Illustrative Reference | Illustrative Returns | Illustrative Returned Data Example |
| --- | --- | --- | --- |
| DomainRole | N/A | Single integer:<br>0 = Standalone Workstation<br>1 = Member Workstation<br>2 = Standalone Server<br>3 = Member Server<br>4 = Backup Domain Controller<br>5 = Primary Domain Controller | 5 |
| EventLogProperty | 2 values- the log and the property:<br>EventLogName~, PropertyName | Single string or integer representing the property | 32168 = 'NumberOfRecords' property in the 'System' Event Log |
| FileAttributes | Full path to file (environment variables allowed)<br>Example:<br>%systemroot%\system32\cmd.exe | Single integer derived from mask:<br>+1 = Read Only<br>+2 = Hidden<br>+4 = System<br>+32 = Archive<br>+2048 = Compressed | 3 = 1 + 2 = Read-only, hidden file |
| FileExists | Full path to file (environment variables allowed)<br>Example:<br>%systemroot%\system32\cmd.exe | Single value: TRUE or FALSE | FALSE |
| FileOrFolderOwner | Full path to file or folder (environment variables allowed)<br>Example: C:\Windows | Single value:<br>domain\user_or_group | domain1\user1 |
| FileOrFolderPermissions | Full path to file or folder (environment variables allowed)<br>Example: C:\Windows | Multiple values, one for each ACL on the file/folder: user/group name, integer access mask* and integer ACL_type in the following format:<br>domain\user_or_group-access_mask - ACL_type | NT SERVICE\eventlog--2032127 - 0<br>NT AUTHORITY\SYSTEM--2032127 - 0 |
| FileSystems | N/A | Multiple values, one for each local file system:<br>file system name, description and file system type in the following | C: - Local Fixed Disk - NTFS |

TABLE 7-continued

Illustrative output, including returned data formats corresponding to ReferenceObject column values.

| Illustrative ReferenceObject | Illustrative Reference | Illustrative Returns | Illustrative Returned Data Example |
|---|---|---|---|
| | | format:<br>fs_name - fs_description - fs_type | |
| FolderAttributes | Full path to file or folder (environment variables allowed)<br>Example: C:\Windows | Single integer derived from mask:<br>+1 = Read Only<br>+2 = Hidden<br>+4 = System<br>+32 = Archive<br>+2048 = Compressed | 2053 = 2048 + 4 + 1 = Read-only, compressed system folder |
| FolderExists | Full path to file or folder (environment variables allowed)<br>Example: C:\Windows | Single value: TRUE or FALSE | TRUE |
| GranularAudit | Name of Windows granular audit item<br>Example: System Integrity | Single string:<br>SUCCESS<br>or<br>FAILURE<br>or<br>SUCCESS AND FAILURE<br>or<br>NO AUDITING | FAILURE |
| NetworkAdapterDesciption | N/A | Multiple values, one for each network adapter found with the [Reference] name:<br>device_ID - status - name - description | 1 - - vmxnet3 Ethernet Adapter - vmxnet3 Ethernet Adapter |
| NetworkAdapterIP | N/A | Multiple values, one for each network adapter found with the [Reference] name:<br>adapter_index - IP_Address - DNS_Domain | 1 - 192.168.1.2 - domain1.com |
| OSArchitecture | N/A | Single string: OS architecture value from WMI | 64-bit |
| OSName | N/A | Single string: OS name value from WMI | Microsoft Windows Server 2019 |
| OSServicePack | N/A | Single string: OS service pack value from WMI (ServicePackMajorVersion.ServicePackMinorVersion) | 2.0 |
| OSVersion | N/A | Single string: OS version value from WMI | 10.0.17763 |
| Processes | Process name to look for<br>Example:<br>cmd.exe | Multiple values, one for each process found with the [Reference] name:<br>process_name - command_line - description - processID | cmd.exe - c:\windows\system32\cmd.exe - Windows Command Processor - 12608 |
| RegistryKeyExists | Full path to registry key (hive abbreviations allowed)<br>Only HKEY_LOCAL_MACHINE (HKLM) is supported at this time.<br>Example:<br>HKEY_LOCAL_MACHINE\Software\Microsoft\Windows NT\CurrentVersion\Winlogon | Single value: TRUE or FALSE | FALSE |
| RegistryValue | Full path to registry value (hive abbreviations allowed)<br>Only HKEY_LOCAL_MACHINE (HKLM) is supported at this time.<br>Example:<br>HKEY_LOCAL_MACHINE\Software\Microsoft\Windows NT\CurrentVersion\Winlogon\AutoAdminLogon | Single value: Value found in registry | 1 |
| RRASEnabled | N/A | TRUE or FALSE, based on whether Windows Routing and Remote Access Services (RRAS) are enabled | FALSE |

TABLE 7-continued

Illustrative output, including returned data formats corresponding to ReferenceObject column values.

| Illustrative ReferenceObject | Illustrative Reference | Illustrative Returns | Illustrative Returned Data Example |
|---|---|---|---|
| SecurityOption | Path to the securityoption value Example: MACHINE\System\CurrentControlSet\Services\NTDS\Parameters\LDAPServerIntegrity | Single string or integer representing the value of the security option setting | 2 |
| SecuritySettingBoolean | Name of the Boolean security setting Example: PasswordComplexity | TRUE or FALSE | TRUE |
| SecuritySettingNumeric | Name of the numeric security setting Example: MinimumPasswordLength | Single integer | 8 |
| Services | Service name to look for Example: Task Scheduler | Multiple values, one for each service found with the [Reference] name: service_state - display_name - name - start_mode - start_name | Started - Task Scheduler - Schedule - Auto - LocalSystem |
| Shares | Share name to look for Example: Admin$ | Multiple values, one for each share found with the [Reference] name: share_name - path | Admin$ - C:\Windows |
| SystemFQDN | N/A | Single string representing the system FQDN from WMI | computer1.domain1.com |
| SystemIPV4 | N/A | Multiple values, each one string representing an IPv4 address configured on the system | 192.168.2.3, 192.168.2.4 |
| SystemAuditingEvent | One of these values: AuditSystemEvents AuditLogonEvents AuditObjectAccess AuditPrivilegeUse AuditPolicyChange AuditAccountManage AuditProcessTracking AuditDSAccess AuditAccountLogon | FAILURE or SUCCESS | SUCCESS |
| Other suitable columns | | | |

Table 8 lists illustrative expected value expressions.

TABLE 8

Illustrative expected value expressions.

| Comparison | Expected Value Example | Description |
|---|---|---|
| RegExContainedIn | ^SUCCESS AND FAILURE$ | Standard regular expression with anchors |
| RegExContainedIn | Running .*- Telnet Server -.* | Standard regular expression with wildcards |
| RegExContainedIn | "^SUCCESS$~, ^SUCCESS AND FAILURE$" | Regular expression list- use the tilde to escape commas that separate items in the list Lists must be delimited with double-quotes |
| IntegerContainedIn | "2~, 3, ~6" | List of single integers |
| IntegerContainedIn | <30001 | Can use less-than (<) and greater-than (>) expressions |
| Other suitable output | | |

The apparatus and methods may include a "transient agent" to perform baseline configuration scans of the computing machine. The agent may include the executable file. The executable file may be copied onto the machine to be scanned, and then run in place and deleted. Permanent installation of scanning software may be unnecessary. The agent may be delivered using any suitable software distribution service that is available or compatible with the sequestered network environment. The agent may produce a comma-separated value ("CSV") file of output for each machine scanned. The files may be sent through a sequestered network firewall to compliance monitoring collectors on the enterprise network.

While the agent itself may include a compiled executable, it is paired with the configuration file, which may define the checks to be performed on the machine. The configuration file may be delivered to, and deleted from, the computing machine immediately after the scan. Hence, the compliance checks performed may be fully configurable, in that the configuration file may be formulated by the second group. In some environments the agent is delivered and run by Microsoft System Center Configuration Manager (SCCM).

The CSV results files may be compiled by scripts running on a server on the enterprise network, and fed into an enterprise monitoring reporting pipeline.

The agent may be technology-agnostic with respect to its execution. It may be run manually, or by any software distribution system, for example, one that supports Microsoft Windows targets. The configuration file and output format may be both machine and human readable and may be integrated into the enterprise monitoring reporting pipeline, an existing baseline, or a reporting work stream.

The agent may be an agent that performs only the scan and evaluation steps. The agent may be compatible with industry-standard input and output formats (such as CSV). The agent may therefore be used in cooperation with varied delivery and data consumption tools.

The agent may perform scanning and evaluation of results at the computing machine being scanned. As such, there is no separate step needed to compare the collected data to a baseline configuration that is expected to be present in the computing machine.

The agent may be executed on the computing machine even if the computing machine is sequestered from the Internet or from the enterprise network. The agent may be an agent that has no dependency on, or restriction to, a set of checks prescribed by a vendor or industry standard.

Illustrative embodiments of apparatus and methods in accordance with the principles of the invention will now be described with reference to the accompanying drawings, which form a part hereof. It is to be understood that other embodiments maybe utilized and that structural, functional and procedural modifications or omissions may be made without departing from the scope and spirit of the present invention.

FIG. 1 is a block diagram that illustrates a computing device 101 (alternatively referred to herein as a "server or computer") that may be used in accordance with the principles of the invention. The computer server 101 may have a processor 103 for controlling overall operation of the server and its associated components, including RAM 105, ROM 107, input/output ("I/O") module 109, and memory 115.

I/O module 109 may include a microphone, keypad, touchscreen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database 111. Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks.

When used in a LAN networking environment, computer 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that may be used to perform the functions of an agent, an executable file, a configuration file, a comparison, and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
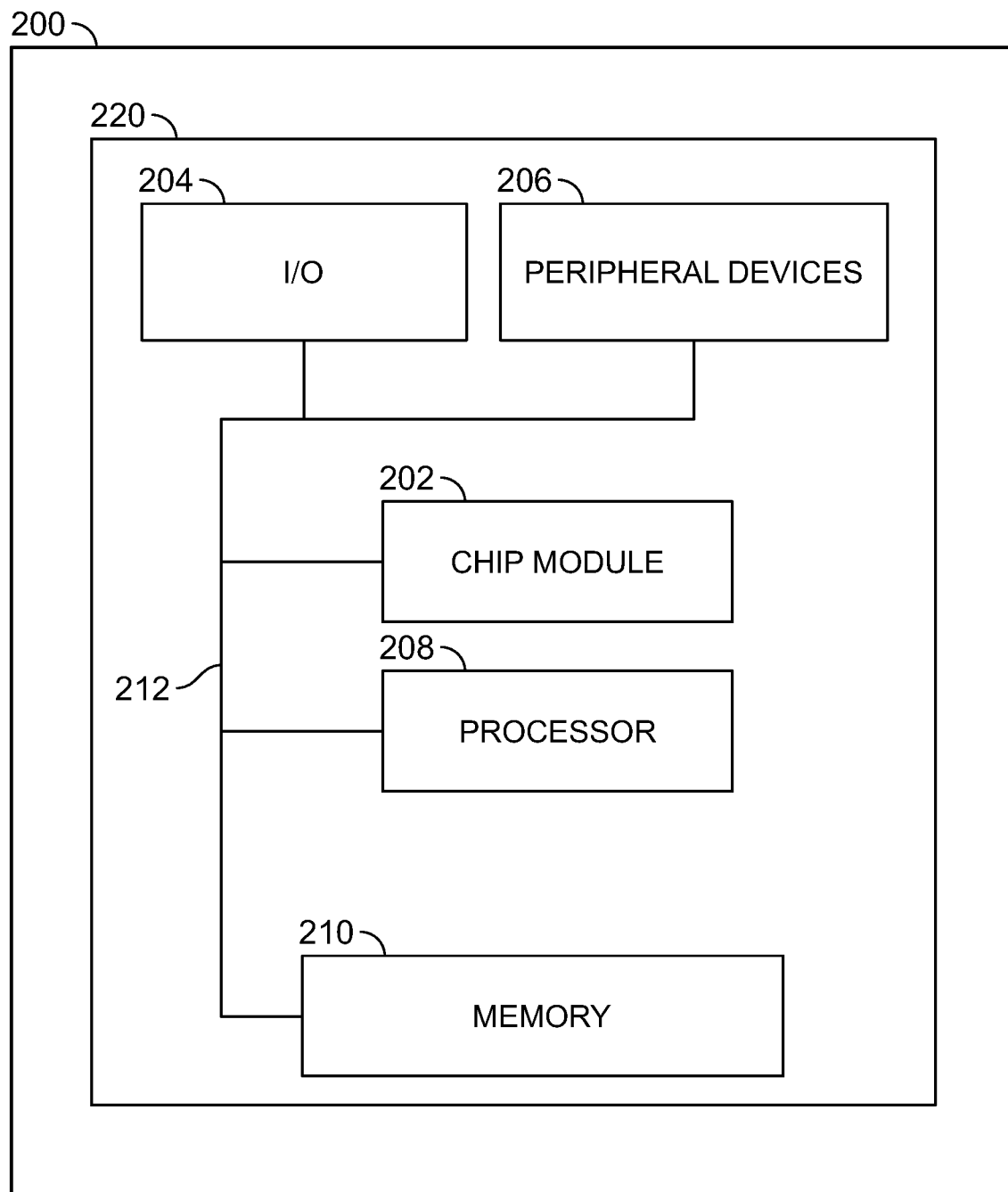
FIG. 2 shows illustrative apparatus that may be used in accordance with principles of the invention.

FIG. 2 shows an illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute comparisons, generate output, and perform other methods described herein; and machine-readable memory 210.

Machine-readable memory 210 may be configured to store in machine-readable data structures: executable files, configuration files, output, and any other suitable information or data structures.

Components 202, 204, 206, 208 and 210 may be coupled together by a system bus or other interconnections 212 and may be present on one or more circuit boards such as 220. In some embodiments, the components may be integrated into a single chip.

The chip may be silicon-based.

Figure 3:
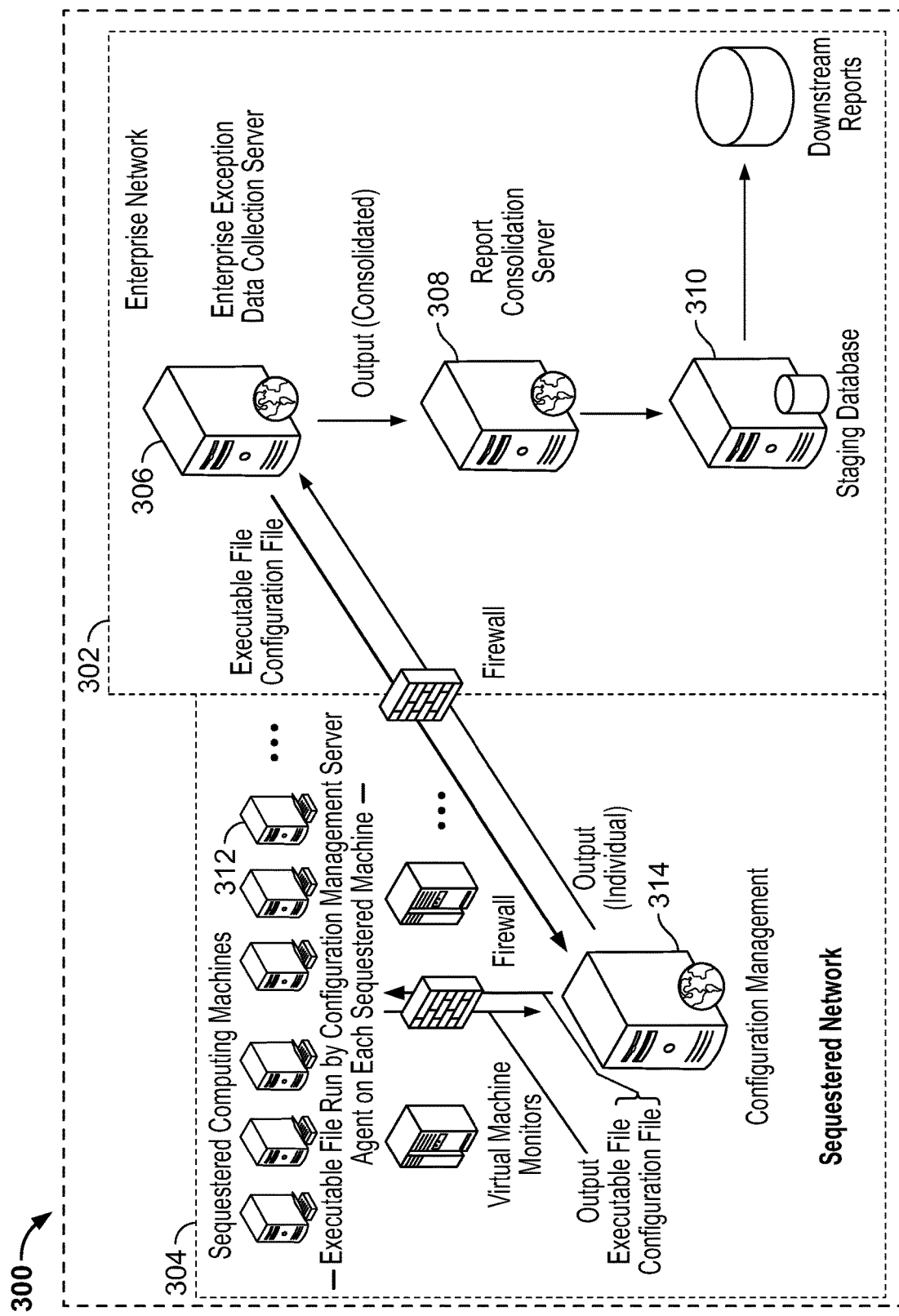
FIG. 3 shows illustrative architecture in accordance with principles of the invention.

FIG. 3 shows illustrative architecture 300 for security scanning. Architecture 300 may include enterprise network 302. Architecture 300 may include sequestered network 304.

Enterprise network 302 may include enterprise exception-data collection server 306. Enterprise network 302 may include enterprise data report consolidation server 308. Enterprise network 302 may include enterprise staging database 310.

Enterprise exception-data collection server 306 may collect configuration exception information from enterprise computers (not shown). The exception information may include scanning output that indicates differences between an expected machine configuration and a configuration observed during scanning.

Enterprise exception-data collection server 306 may consolidate the exception information. Enterprise exception-data collection server 306 may transmit the consolidated exception information to staging database 310. Staging database 310 may provide downstream reports to enterprise entities who may take corrective action in response to the reports.

Enterprise exception-data collection server 306 may exchange information with machines that are in communication with a wide area network, such as the Internet.

Sequestered network 304 may include sequestered computing machines 312. Sequestered computing machines 312 may be sequestered from the wide area network. Enterprise exception-data collection server 306 may be prohibited from communicating directly with sequestered computing machines 312.

To scan sequestered computing machines 312, enterprise exception-data collection server 306 may provide to configuration management server 314 an executable file and a configuration file. Configuration management server 314 may create, for each of the sequestered computing machines 312, an agent to pass the executable file and the configuration file to the sequestered computing machine. On each of sequestered computing machines 312, the agent executes the executable file. The executable file compares expected configuration records from the configuration file to scanned configuration records from the sequestered computing machine. The executable file generates output that includes exceptions based on differences between the expected configuration records from the configuration file and the scanned configuration records from the sequestered computing machine.

The agent returns the output to configuration management server 314. Configuration management server 314 returns the output to enterprise exception-data collection server.

Figure 4:
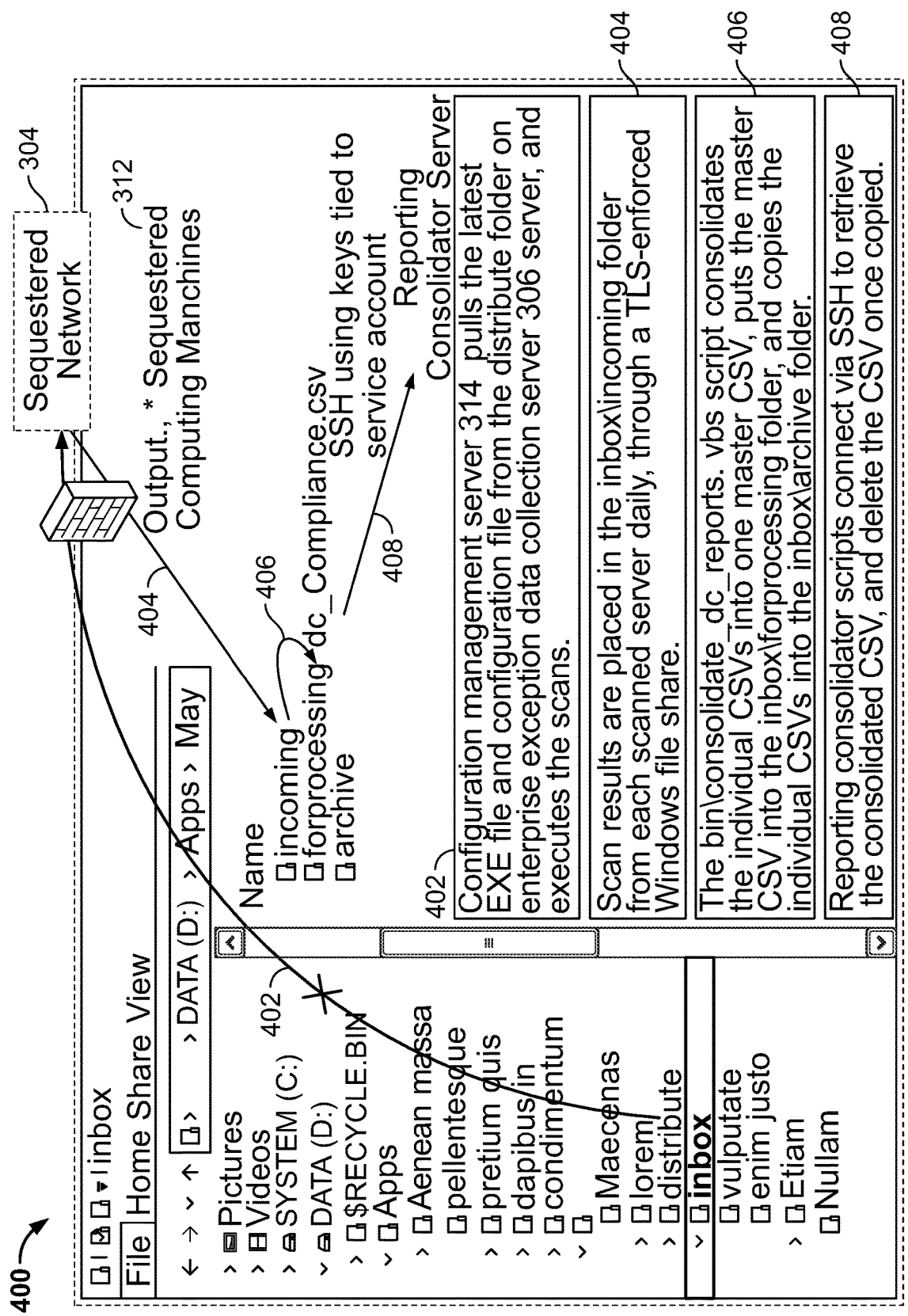
FIG. 4 shows illustrative process steps in accordance with principles of the invention.

FIG. 4 shows illustrative output consolidation process flow 400. At step 402 configuration management server 314 may pull the latest executable file and configuration file from enterprise exception-data collection server 306. Configuration management server 314 may create an agent to execute the executable file on one or more of sequestered computing machines 312.

At step 404, the agent may export output from execution of the executable file to configuration management server 314. At step 404, the output may be transferred via a TLS-enforced Windows file share.

Configuration management server 314 may then pass the output to enterprise exception-data collection server 306.

At step 406, enterprise exception-data collection server 306 may consolidate individual outputs from each of sequestered computing machines 312 into a revised output file.

At step 408 report consolidation server 308 may retrieve a copy of the revised output file. Report consolidation server 308 may delete the original revised output file from enterprise exception-data collection server 306.

Figure 5:
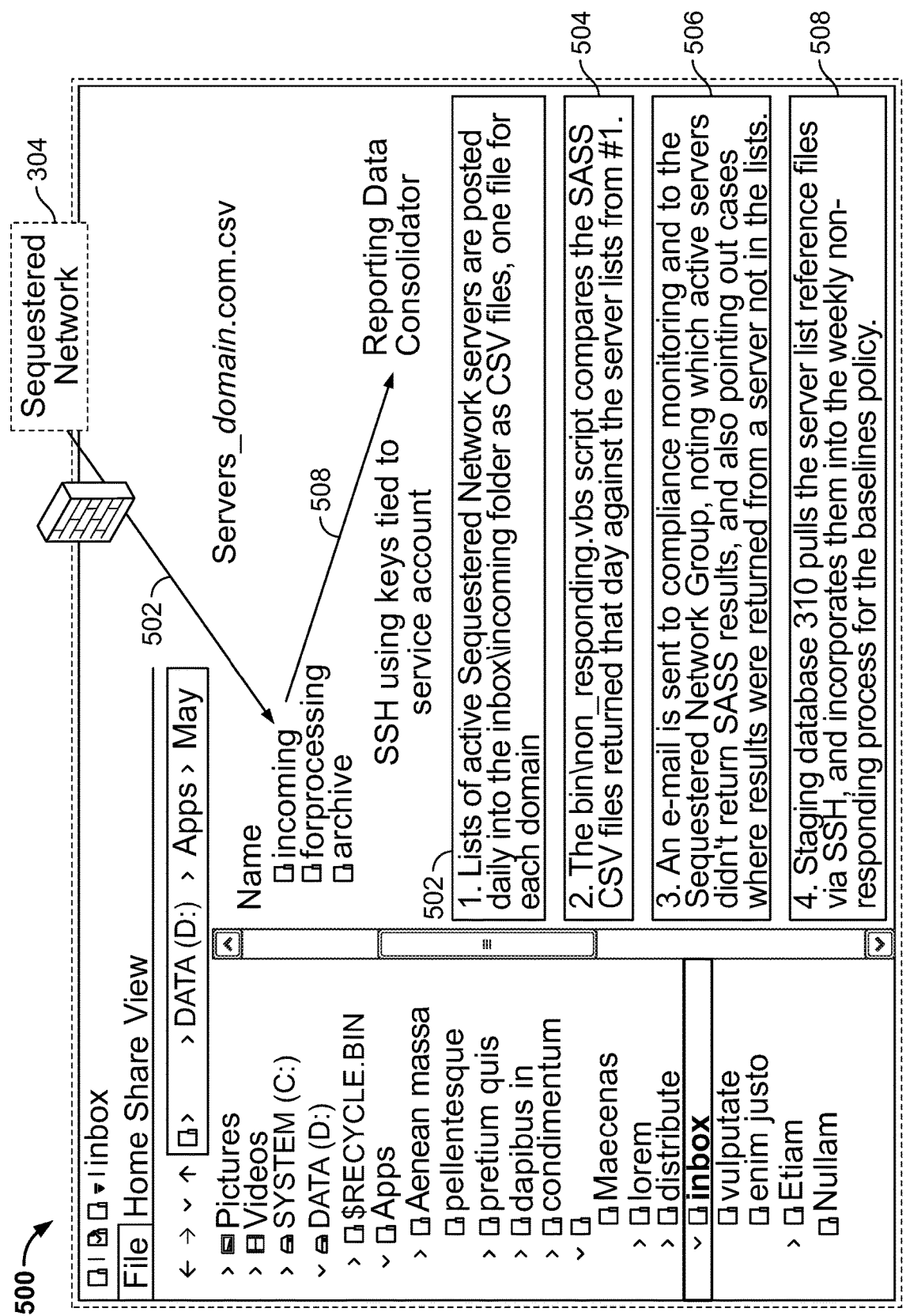
FIG. 5 shows illustrative process steps in accordance with principles of the invention.

FIG. 5 shows illustrative non-responding reporting process flow 500. Process flow 500 may start at step 502. At step 502, configuration management server 314 posts, to enterprise exception-data collection server 306, a daily census of active sequestered computing machines 312. At step 504, enterprise exception-data collection server 306 compares the sources of each of the outputs of the sequestered computing machines 312 to the census. A sequestered computing machines 312 that is listed on the census, but for which there is no corresponding output, is determined to be "non-responding." At step 506, enterprise exception-data collection server 306 may notify a support group that is permissioned to access configuration management server 314 that a certain one or more of the sequestered computing machines 312 is non-responding. If enterprise exception-data collection server 306 receives output from a sequestered computing machine 312 that is not listed in the census, enterprise exception-data collection server 306 may notify the support group of the output that has no corresponding listing in the census. A second support group that is not permissioned to access configuration management server 314 may be permissioned to access only resources in enterprise network 302.

At step 508, staging database 310 may pull daily census files and route them for inclusion in downstream reports.

FIG. 6 shows illustrative configuration file header 600. The configuration file header may include 4, or any other suitable number of, required "comments" 602. Comments 602 may indicate a policy name, a last modification date, a current version number of the file, and column headers. For the purposes herein, a "policy" corresponds to a set of configuration records in a configuration file.

Comments 602 may be the first lines in the configuration file. Extra commas (",") after the first three lines are immaterial in a CSV implementation.

FIG. 7 shows illustrative first configuration file format 700. File format 700 may be case-insensitive. Checks 702 in the configuration file be organized based on baseline ID 704. Baseline ID 704 may name a category of the checks. Check 702 may be in the category. A check is a configuration file record that represents an item on a sequestered computing machine 312 that is to be checked by the agent. A baseline ID is an category of check. The baseline ID may be established by the second group, even though it does not have access to sequestered network 304. The configuration file records may be left-justified—not indented.

Figure 8:
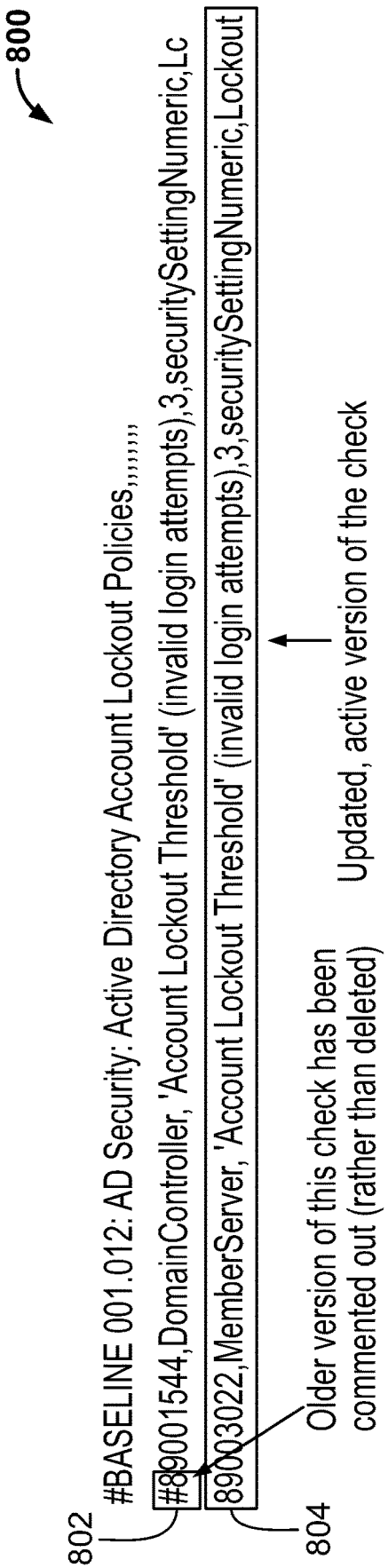
FIG. 8 shows illustrative information in accordance with principles of the invention.

FIG. 8 shows illustrative check records 800. Check 802 has been inactivated by commenting out. Check 804 may be a new version of check 802. Check 804 may be active.

Figure 9:
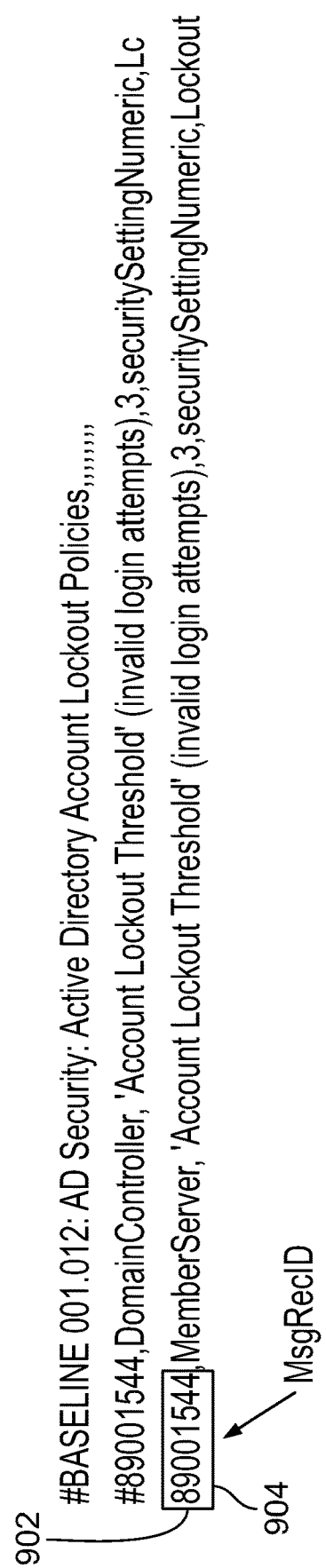
FIG. 9 shows illustrative information in accordance with principles of the invention.

FIG. 9 shows illustrative checks 900. Check 902 may include arbitrary ID number ("MsgRecID") 904. A MsgRecID may appear multiple times in a configuration file. For example, if a check applies to both domain controllers and member servers, the check may be used in connection with one or more of the domain controllers and member servers.

FIG. 10 shows illustrative checks 1000. Check 1002 may in field 1004 identify the check target as a domain controller. Check 1006 may in field 1008 identify the check target as a member server. If the scanned machine is not of the indicated type, the check will not be performed for the scanned machine.

FIG. 11 shows illustrative checks 1100. Message title column 1102 indicates the name of the check that will appear in the output. A message title may occur more than once in a configuration file.

FIG. 12 shows illustrative checks 1200. Severity column 1202 may indicate a severity of risk that will appear in the output. A severity value may be required for each record. The severity value may be an integer. Table 9 shows illustrative risk ratings.

TABLE 9

Illustrative risk ratings

| Value | Priority | Description |
|---|---|---|
| 1 | P1 | Clear and Present Danger (CaPD |
| 2 | P2 | Critical |
| 3 | P3 | High |
| 4 | P4 | Watch |
| 5 | P5 | Informational |
| Other suitable ratings | | |

FIG. 13 shows illustrative checks 1300. ReferenceObject column 1302 includes the value "fileSystems," indicating that check 1304 operates on file systems on the scan target.

FIG. 14 shows illustrative records 1400. Reference column 1402 indicates a specific setting for which the check is designated. Not all checks use the reference column. For example, in record 1404, reference column 1402 is blank.

FIG. 15 shows illustrative check 1500. Registry value column 1502 indicates a registry value to that check 1500 seeks to check.

FIG. 16 shows illustrative checks 1600. Condition 1602, "regExNotContainedIn," will cause check 1604 to fail if value 1606 is returned by the scan.

FIG. 17 shows illustrative check 1700. NotFoundOK column 1702 includes a value that determines whether or not it is "OK" that a scanned-for value is not found. The value (e.g., 0) may indicate that the check should "fail" if the scanned-for value is not found. The value (e.g., 1) many indicate that the check should "pass" if the scanned-for value is not found.

FIG. 18 shows illustrative check 1800. NotFoundOK column 1802 includes a value that determines whether or not it is "OK" that a scanned-for value is not found. The value (e.g., 0) may indicate that the check should "fail" if the scanned-for value is not found. The value (e.g., 1) many indicate that the check should "pass" if the scanned-for value is not found.

FIG. 19 shows illustrative output file header 1900. Header 1900 may include one or more field names. The field names may be separated by commas.

FIG. 20 shows illustrative output records 2000. In check 2002, result value 2004 shows "FAILED," indicating that the target failed to pass the check. In check 2006, result value 2008 shows "PASSED," indicating that the target succeeded in passing the check.

FIG. 21 shows illustrative output records 2100. HostIP column 2102 may include host IP addresses of the targets, such as host IP address 2104. The addresses may be IPv4 addresses.

FIG. 22 shows illustrative output records 2200. FQ_Hostname column 2202 may include fully-qualified hostnames (DNS names) of the targets, such as FQDN 2204.

FIG. 23 shows illustrative output records 2300. Short_Hostname column 2302 may include short host names of the targets, such as host name 2304.

FIG. 24 shows illustrative output records 2400. Severity column 2402 may include severity values of the targets, such as severity value 2404.

FIG. 25 shows illustrative output records 2500. MsgRecID 2502 may include a check ID number specified in the configuration file, such as check ID number 2504.

FIG. 26 shows illustrative output records 2600. Message column 2602 may include a checks message title, as specified in the configuration file, such as check title 2604.

FIG. 27 shows illustrative output records 2700. Description column 2702 may include a description of the check. In record 2704, description 2706 is blank. The blank may indicate that the description column is not in use. The description column may be reserved for future use.

FIG. 28 shows illustrative output records 2800. Result_Details column 2802 may include a configuration that was found on the target, along with the expected configuration, as specified in the "Expected" column of the configuration file, such as result details 2804 and 2806, in record 2801, and result details 2808 and 2810, in record 2803.

FIG. 29 shows illustrative output records 2900. Reference column 2902 may include a check reference, as specified in the configuration file, such as check reference 2904. If there is no applicable reference for the check, the value in column 2902 may be blank.

FIG. 30 shows illustrative output records 3000. OS_CPE column 3002 may indicate an operating system of the target, in CPE format, such as operating system 3004.

FIG. 31 shows illustrative output records 3100. LastScanDate column 3102 may indicate a last scan date and time of the target, such as date and time 3104.

FIG. 32 shows illustrative output records 3200. OS_Info column 3202 may indicate an abbreviated moniker for the OS running on the target, such as moniker 3204. Table 10 lists illustrative monikers.

TABLE 10

Illustrative monikers.

| Value |
|---|
| WIN2003 |
| WIN2012 |
| WIN2016 |
| WIN2019 |
| WIN7 |
| WIN8 |
| WIN10 |
| Other suitable ratings |

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Thus, methods and apparatus for security scanning have been provided. Persons skilled in the art will appreciate that the present invention may be practiced by other than the described embodiments, which are presented for purposes of illustration rather than of limitation. The present invention is limited only by the claims that follow.

What is claimed is:

1. Apparatus for security scanning, the apparatus comprising: a data collection machine configured to:
   transmit an executable file, from an enterprise monitoring process, to a computing machine, that:
   is set to be accessed only by a group of users; and
   does not have a pipeline to the Internet; cause the computing machine to execute the executable file; and derive, from an output of the executable file, a monitoring condition in the computing machine; wherein:
   the enterprise monitoring process is owned by a first party;
   the computing machine includes an application product sourced from a second party; and
   no application resident on the computing machine is sourced from a party other than the second party; and
   wherein the data collection machine is further configured to send to the computing machine a configuration file that includes a security configuration record;
   wherein the executable file is configured to: retrieve from storage in the computing machine a security item; and compare the security configuration record to the security item.

2. The apparatus of claim 1 wherein the enterprise monitoring process includes only individuals that are not part of the group.

3. The apparatus of claim 1 wherein the data collection machine is configured to block the configuration file from transmission to the Internet.

4. The apparatus of claim 1 wherein the security item includes file metadata.

5. The apparatus of claim 4 wherein the metadata includes a filename.

6. The apparatus of claim 4 wherein the metadata includes a version number.

7. The apparatus of claim 1 wherein:
   the computing machine is a machine of a plurality of computing machines, each of which:
   is set to be accessed only by the group of users; and
   does not have a pipeline to the Internet;
   the plurality of computing machines is contained within a security airgap; and
   the security airgap encompasses a software distribution server that is in electronic communication with each of the computing machines.

8. The apparatus of claim 7 wherein the data collection machine is configured to transmit the executable file to the server.

9. Method for security scanning, the method comprising:
   transmitting an executable file, from an enterprise monitoring process, to a computing machine;
   that:
   is set to be accessed only by a group of users; and does not have a pipeline to the Internet, and,
   using the computing machine: executing the executable file; and
   deriving, from an output of the executable file, a monitoring condition in the computing machine,
   wherein: the computing machine is a machine of a plurality of computing machines, each of which: is set to be accessed only by the first group of users; and
   does not have a pipeline to the Internet; the plurality of computing machines is contained within a security airgap;
   the security airgap encompasses a software distribution server that is in electronic communication with each of the computing machines;
   the transmitting includes sending the executable file to the server;
   the enterprise monitoring process is owned by a first party; the server includes an application product sourced from a second party; and
   no application resident on any of the plurality of computing machines is sourced from a party other than the second party; and
   transmitting, from the enterprise monitoring process, to the computing machine, a configuration file that includes a security configuration record;
   wherein the executing includes using the executable file to compare the security configuration record to a security item retrieved from storage in the computing machine.

10. The method of claim 9 further comprising, when the group of users is a first group of users, providing the report to a second group of users that:
    are part of the enterprise monitoring process; and
    are not part of the first group.

11. The method of claim 9 further comprising blocking the configuration file from transmission to the Internet from the enterprise process.

12. The method of claim 9 wherein the deriving includes providing a comparison of the security configuration record and the security item.

13. The method of claim 10 wherein:
    the computing machine is a machine of a plurality of computing machines, each of which:
    is set to be accessed only by the first group of users; and
    does not have a pipeline to the Internet;
    the plurality of computing machines is contained within a security airgap; and
    the security airgap encompasses a software distribution server that is in electronic communication with each of the computing machines.

14. The method of claim 9 wherein the providing includes sending the report from the server.

\* \* \* \* \*